United States Patent [19]
Hayashi et al.

[11] Patent Number: 5,237,702
[45] Date of Patent: Aug. 17, 1993

[54] SYSTEM FOR PREFETCHING VECTOR DATA BASED ON THE STATUS OF THE VECTOR REGISTERS

[75] Inventors: Hideo Hayashi, Tokyo; Atsuo Mochizuki, Yamanashi, both of Japan

[73] Assignee: NEC Corporation, Tokyo, Japan

[21] Appl. No.: 419,734

[22] Filed: Oct. 11, 1989

[30] Foreign Application Priority Data

Oct. 11, 1988 [JP] Japan ............................... 63-255600

[51] Int. Cl.⁵ .................... G06F 15/347; G06F 12/00; G06F 13/00
[52] U.S. Cl. .............................. 395/800; 364/232.21; 364/244.3; 364/247; 364/263.1; 364/DIG. 1
[58] Field of Search ... 364/200 MS File, 900 MS File; 395/800, 375

[56] References Cited

U.S. PATENT DOCUMENTS

| | | | |
|---|---|---|---|
| 4,772,049 | 1/1988 | Lahti | 395/800 |
| 4,825,361 | 4/1989 | Omoda et al. | 395/800 |
| 4,949,250 | 8/1990 | Bhandarkar et al. | 395/375 |
| 5,010,477 | 4/1991 | Omoda et al. | 395/800 |

FOREIGN PATENT DOCUMENTS 0232827 8/1987 European Pat. Off. .

OTHER PUBLICATIONS

Patent Abstracts of Japan, vol. 12, No. 178 (P-708)[3025], May 26, 1988 (JP-A-62 288 974).
Patent Abstracts of Japan, vol. 4, No. 177 (P-039), Dec. 9, 1980 (JP-A-55 118 168).

Primary Examiner—Parshotam S. Lall
Assistant Examiner—Ayni Mohamed
Attorney, Agent, or Firm—Foley & Lardner

[57] ABSTRACT

In a vector processor, a decoder generates a load request signal if an instruction stored in an instruction register is a vector load instruction and causes the instruction to be transferred to a stack. A resource manager has a plurality of flags associated respectively with vector registers provided in a calculation circuit and constantly updates the flags in accordance with contents of the associated vector registers. A contention detector is responsive to a vector load instruction being loaded into the stack for generating a proceed-to-transfer signal if no contention is detected between the vector load instruction and a corresponding flag in the resource manager. A buffer is provided in a memory controller for storing vector data from the memory in response to the load request signal from the decoder and transferring it to the calculation circuit in response to the proceed-to-transfer signal from the contention detector.

2 Claims, 5 Drawing Sheets

Legend:
a, b : Load request
c, e : Proceed-to-transfer
d, f : Start-of-transfer

SYSTEM FOR PREFETCHING VECTOR DATA BASED ON THE STATUS OF THE VECTOR REGISTERS

BACKGROUND OF THE INVENTION

The present invention relates generally to vector processors, and more specifically to a vector processor having improved data loading circuitry.

Conventional vector processors include a main memory in which instructions and vector data are stored, a memory controller that accesses the memory, a calculation circuit to perform vector calculations on data read out of the memory, and an execution controller which interprets instructions from the memory and monitors available resources, or vector registers to control the pipelined components of the processor so that vector calculations are performed at high speeds. The operating performance of a conventional vector processor can be evaluated by executing the following vector instructions:

| | | |
|---|---|---|
| VLD | V1 | (1) |
| VADD | V2 ←S+V1 | (2) |
| VLD | V3 | (3) |
| VMPY | V4 ←V2×V3 | (4) |

Instruction (1) is a "vector load" instruction that directs the loading of vector data from the main memory into a vector register V1, instruction (2) is in addition instruction that directs the summing of vector data in register V1 with a scalar value S and the loading of the result into a vector register V2, and instruction (3) is a second vector load instruction that directs the loading of vector data from the memory into a register V3. Instruction (4) is a multiplication instruction that directs multiplication of data in register V2 with data in register V3 and directs the storing of the result into a register V4. FIG. 1 depicts a series of events involved with the execution of instructions (1) through (4) using the prior art vector processor. The execution controller of the processor first analyzes instruction (1) as it is loaded into the instruction register and directs the memory controller to access the memory to load vector data into register V1. As the vector register V1 is being loaded, the execution controller directs the calculation circuit to execute instruction (2) by adding a scalar value S to the data loaded into register V1 and loading the result into register V2. In response to instruction (3), the execution controller directs the memory controller to access the memory to load vector data into register V3 and waits until the result of the addition is loaded into register V2, whereupon it urges the calculation circuit to execute instruction (4).

However, if it takes a substantial amount of time for the memory controller to access vector data in the memory, the calculation circuit would have to wait until the data is ready for calculation since the vector load instruction is not issued to the memory controller until the next instruction is supplied to the calculation circuit. Therefore, a system slowdown can occur as a result of access delays.

SUMMARY OF THE INVENTION

It is therefore an object of the present invention to provide a vector processor which is free from prior art disadvantages caused by delays in accessing vector data.

This object is attained by loading vector data from the memory into a buffer prior to the time the next instruction is issued to a calculation circuit if a vector register is available for calculation.

According to the present invention, an instruction stack is connected to an instruction register into which instructions are fetched from a memory. A decoder is connected to the instruction register for generating a load request signal when the instruction stored in the instruction register is a vector load instruction and causing the instruction to be transferred from the register to the instruction stack. A resource manager has a plurality of flags associated respectively with vector registers provided in a calculation circuit and constantly updates the flags in accordance with contents of the associated vector registers. A contention detector is connected to the resource manager and the instruction stack for detecting a contention therebetween. The contention detector is responsive to a vector load instruction being loaded into the stack for generating a proceed-to-transfer signal if no contention is detected between the vector load instruction and a corresponding flag in the resource manager. A buffer is provided in a memory controller for loading vector data from the memory in response to the load request signal from the decoder and loading vector data from the buffer into the calculation circuit in response to the proceed-to-transfer signal from the contention detector.

BRIEF DESCRIPTION OF THE DRAWINGS

The present invention will be described in further detail with reference to the accompanying drawings, in which.

DETAILED DESCRIPTION

Figure 1:
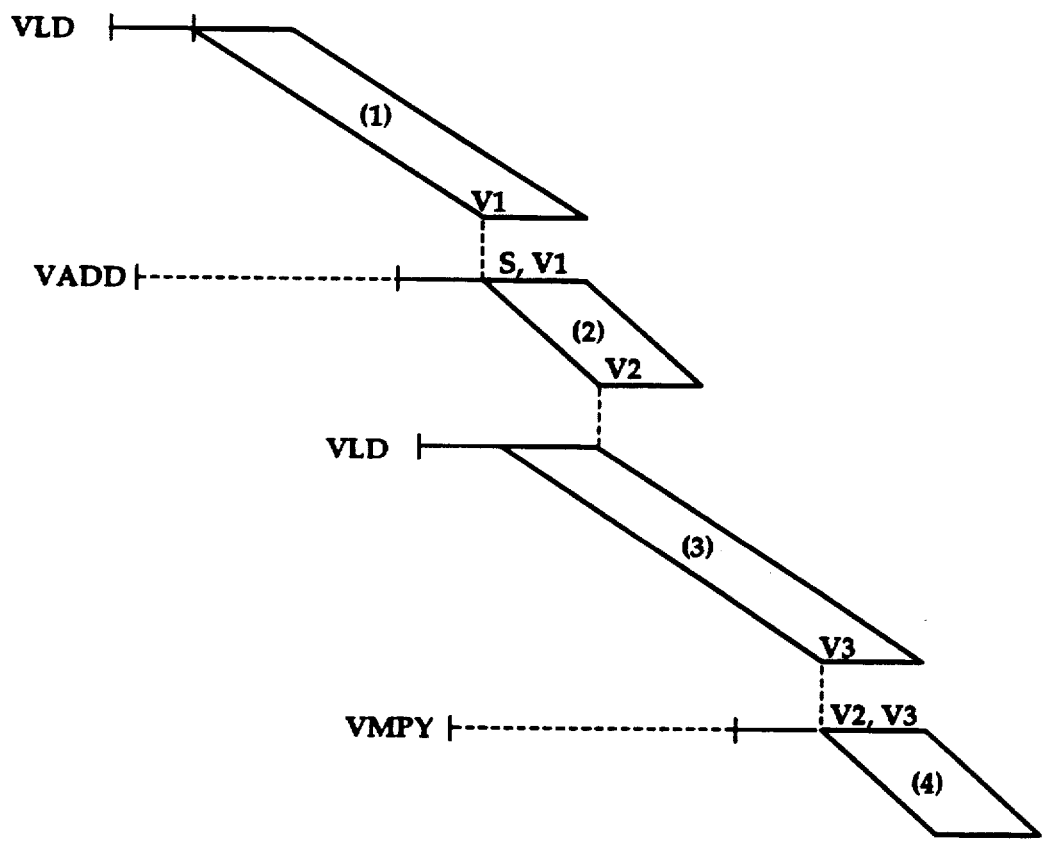
FIG. 1 is a timing diagram of vector calculations performed by a prior art vector processor.
Figure 2:
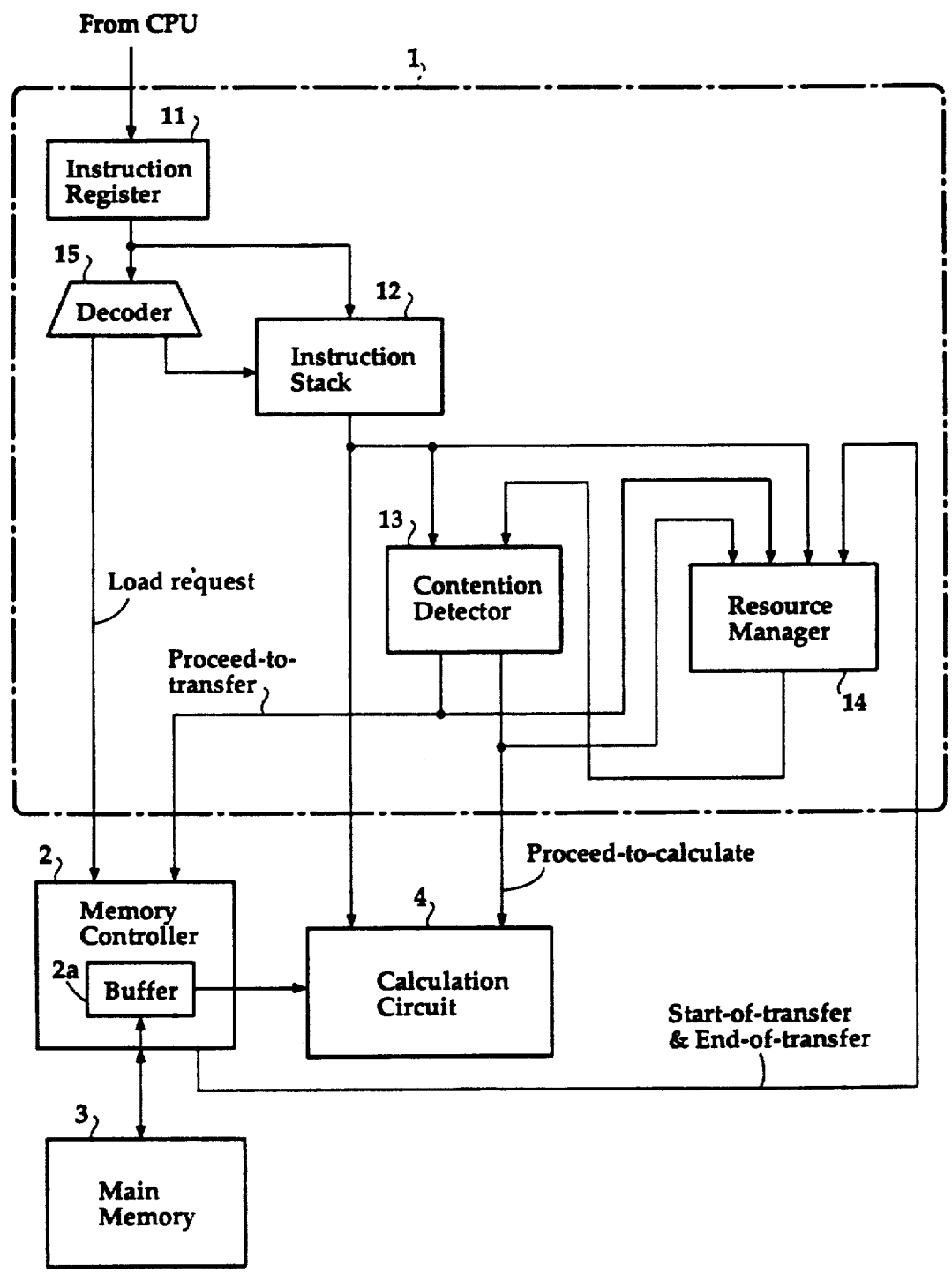
FIG. 2 is a block diagram of a vector processor of the present invention.

Referring now to FIG. 2, there is shown a vector processor according to an embodiment of the present invention. The vector processor of the invention generally comprises an execution controller 1, a memory controller 2 having a buffer 2a for storing data read out of a main memory 3 in which data and instructions are stored, and a calculation circuit 4. Execution controller 1 includes an instruction register 11 connected to a common bus (not shown), an instruction stack 12, a contention detector 13, a resource manager 14, and a decoder 15.

An instruction fetched by the CPU (not shown) from the main memory 3 is supplied through the common bus and stored into the instruction register 11 for temporary storage. Decoder 15 examines the instruction stored in register 11 to determine if there is a "vector load" instruction in the instruction register 11 and, if there is none, it causes the instruction stack 12 to read that instruction from the register 11. If there is one, decoder 15 causes a "load request" signal to be supplied to the memory controller 2, while causing the instruction stack 12 to read an instruction from the register 11. In response to the "load request" signal, the memory controller 2 accesses the memory 3 to begin a process for storing vector data into the buffer 2a.

Resource manager 14 receives a proceed-to-transfer signal and a proceed-to-calculate instruction from the contention detector 13, instructions from the stack 12, and start-of-transfer and end-of-transfer signals from the memory controller 2. Based upon these signals and instructions, the resource manager 14 updates the various resources available in the calculation circuit 4, such as vector registers, to produce resource management data, which are to be supplied to the contention detector 13.

Figure 3:
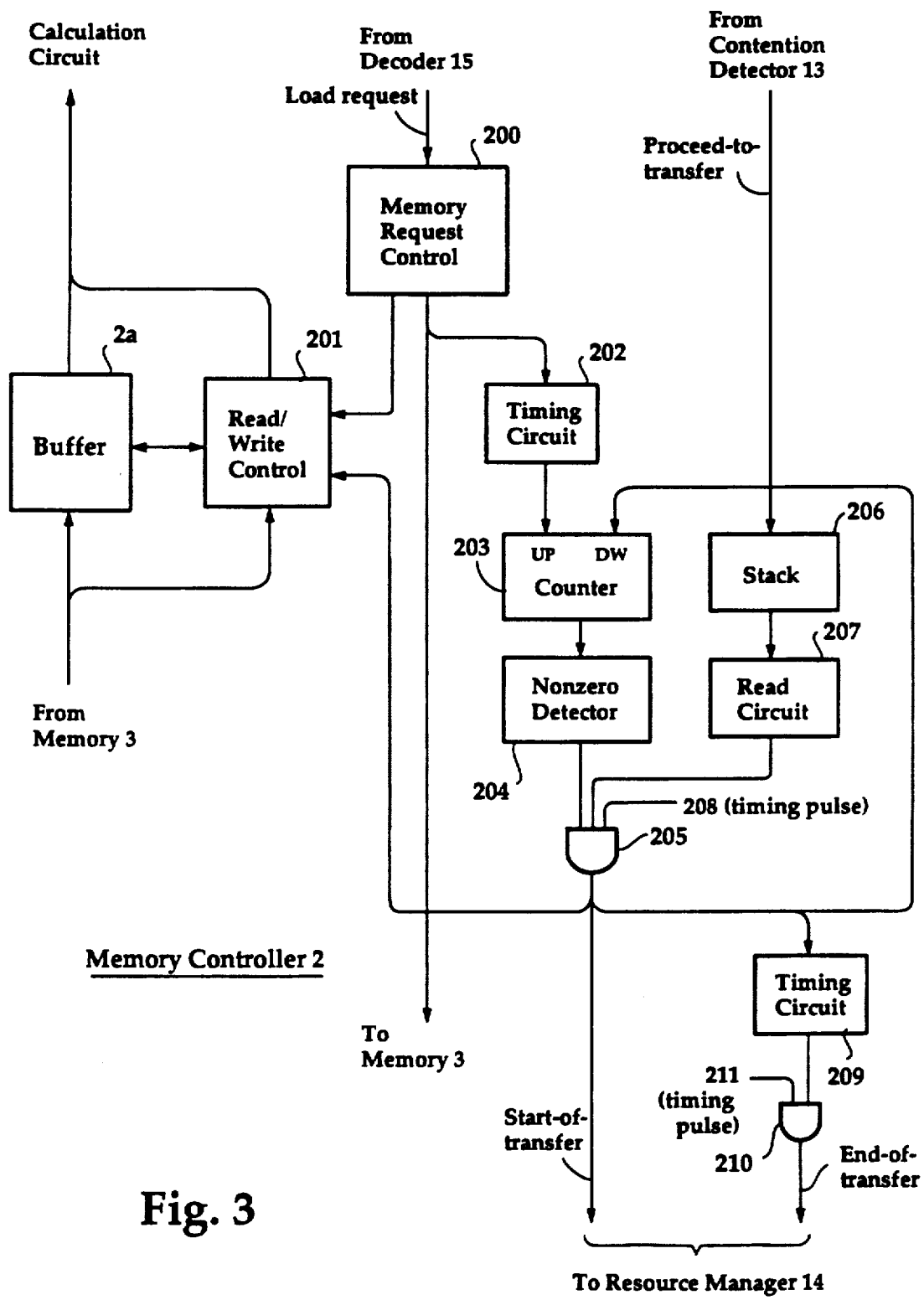
FIG. 3 is a block diagram of the memory controller of FIG. 2.

As shown in FIG. 3, the memory controller 2 comprises a request manager 200 to which the "load request" is applied from the decoder 15. On receiving this signal, the manager 200 checks to see if there is one that is being processed. If there is one, the request is queued. If there is none, the manager 200 sends access information such as "main-memory request" and addresses to the memory 3, while enabling a read/write manager 201. Memory 3 responds to the "main-memory request" by forwarding vector data and an appropriate address to buffer 2a and read/write manager 201. Read/write manager 201 specifies a location of the buffer 2a in response to the address it received from the memory 3 to store the vector data therein.

On the other hand, the main-memory request issued from the request manager 200 is passed through a timing circuit 202 to the count-up input of an up-down counter 203. The purpose of timing circuit 202 is to introduce a delay so that the counter 203 is timed to increment its count by one with the transfer of corresponding data to the buffer 2a. Therefore, the content of counter 203 indicates the number of granted "load requests" whose corresponding vector data have been put in the buffer 2a.

A nonzero detector 204 is connected to the counter 203. If the counter 203 is not zero, detector 204 supplies a logical 1 to a gate 205 to enable it to open in response to a logical 1 at input 208 from a timing circuit, not shown. If zero is reached in counter 203, the output of detector 204 switches from logical 1 to logical 0 to disable, or close the gate 205. Proceed-to-transfer signals from the contention detector 13 are received by a stack 206 and each proceed-to-transfer signal is read out of the stack 206 by a read circuit 207. If gate 205 is open, the output of read circuit 207 is applied to the resource manager 14 as a start-of-transfer signal.

The proceed-to-transfer signal from the contention circuit 13 contains information that indicates to which one of many vector registers a given data item is to be transferred. Thus, the start-of-transfer signal from the memory controller 2 also bears information as to which vector register is ready to receive data. This start-of-transfer signal is also fed to the read/write manager 201 and to the count-down input of up-down counter 203 to decrement it by one. Read/write manager 201 responds to this start-of-transfer signal by generating addresses to successively read data items out of buffer 2a into the appropriate vector registers of calculation circuit 4.

The start-of-transfer signal is also applied to a timing circuit 209. This timing circuit produces a delayed pulse which coincides with the timing at which all data items have been transferred to appropriate vector registers of the calculation circuit 4. The delayed pulse is applied to a gate 210 to which a periodic timing signal is also supplied from a timing circuit, not shown. Gate 210 is thus opened at periodic intervals to pass the delayed pulse from the timing circuit 209 as an end-of-transfer signal to the resource manager 16.

Figure 4:
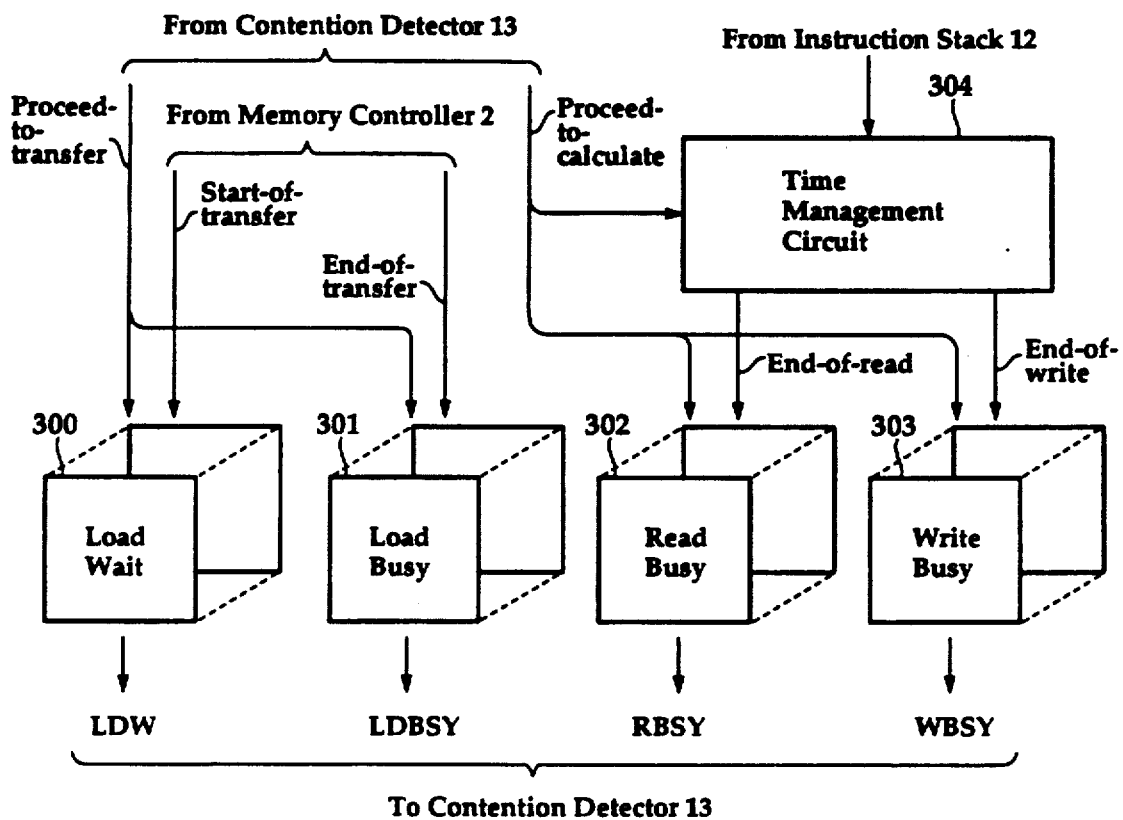
FIG. 4 is a block diagram of the resource manager of FIG. 2.

As shown in FIG. 4, resource manager 14 essentially comprises load wait management flags 300, load busy management flags 301, read busy management flags 302, and write busy management flags 303. These management flags have corresponding vector registers in the calculation circuit 4 and are constantly updated with the proceed-to-transfer signal and proceed-to-calculate signal supplied from the contention detector 13 in response to each of the start-of-transfer and end-of-transfer signals from the memory controller 2.

Specifically, load wait management flags 300 are set in response to a proceed-to-transfer signal from the contention detector 13 and reset in response to a start-of-transfer signal from the memory controller 2. Load busy management flags 301 are set in response to the proceed-to-transfer signal and reset in response to the end-of-transfer signal. Read busy management flags 302 are set in response to the proceed-to-calculate instruction and reset in response to an end-of-read signal. Write busy management flags 303 are set in response to a proceed-to-calculate instrution and reset in response to an end-of-write signal.

A time management circuit 304 is provided to receive from the stack 12 a count of vector elements contained in each instruction and determines the amount of time elapsed from the reception of a proceed-to-calculate instruction to the time at which the reading of a given vector register is complete and further determines the amount of time elapsed from the reception of the proceed-to-calculate instruction to the time at which the writing of the given vector register is complete. Time management circuit 304 generates an end-of-read signal at the end of a vector read operation and generates an end-of-write signal on completing a vector write operation. Signals designated LDW (load wait), LDBSY (load busy), RBSY (read busy) and WBSY (write busy) indicate the set and reset conditions of the flags and are supplied to the contention detector 13.

Figure 5:
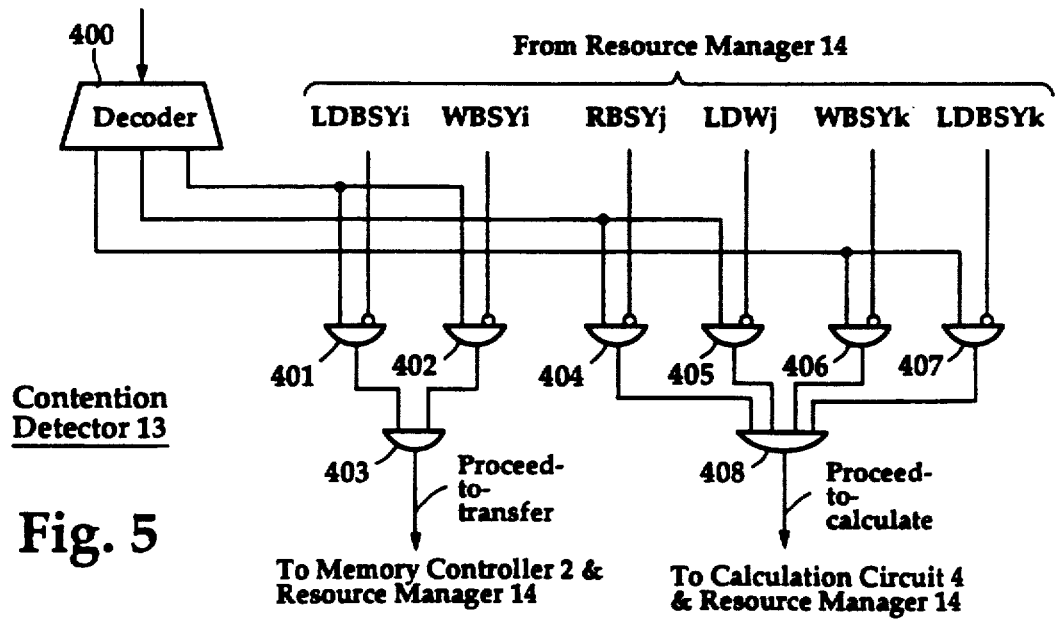
FIG. 5 is a circuit diagram of the contention detector of FIG. 2.

In FIG. 5, contention detector 13 comprises a decoder 400 and a gate array formed by gates 401 through 408. If the first of a series of instructions stored in the stack 12 is a "vector load" instruction which directs the loading of a vector register $VR_i$ with vector data, a signal $VLD_i$ identifying that vector register is issued from the decoder 400 and supplied to gates 401 and 402 to which load-busy ($LDBSY_i$) and write-busy ($WBSY_i$) signals are also supplied from the resource manager 14. These signals respectively indicate whether the vector register $VR_i$ is "load busy" or "write busy." If none of these conditions exists, the signal $VLD_i$ is passed through gate 403 and applied to the memory controller 2 as a proceed-to-transfer signal.

If the first stack instruction is one that involves reading the content of a vector register $VR_j$, calculating it, and writing the result of the calculation into a vector register $VR_k$, then a signal $VR_{rj}$ is issued from the decoder 400 for reading the content of vector register $VR_j$ and supplied to gates 404 and 405 and, at the same time, a signal $VR_{wk}$ is issued from the decoder 400 for writing data into a vector register $VR_k$ and supplied to gates 406 and 407. The signals supplied to the gates 404, 405, 406 and 407 respectively are matched with signals from the resource manager 14. To gate 404 is supplied a signal $RBSY_j$ indicating if the content of vector register $VR_j$ is being read out or not. The signal supplied to gate 405 is $LDW_j$ which indicates if vector register $VR_j$ is waiting to be loaded or not. The signal fed to gate 406 is $WBSY_k$ indicating if vector register $VR_k$ is being written or not, and the one fed to gate 407 is $LDBSY_k$ which indicates whether the vector register $VR_k$ is being loaded or not. If none of these busy conditions exists, a proceed-to-calculate instruction will be issued from gate 408 to the calculation circuit 4.

Figure 6:
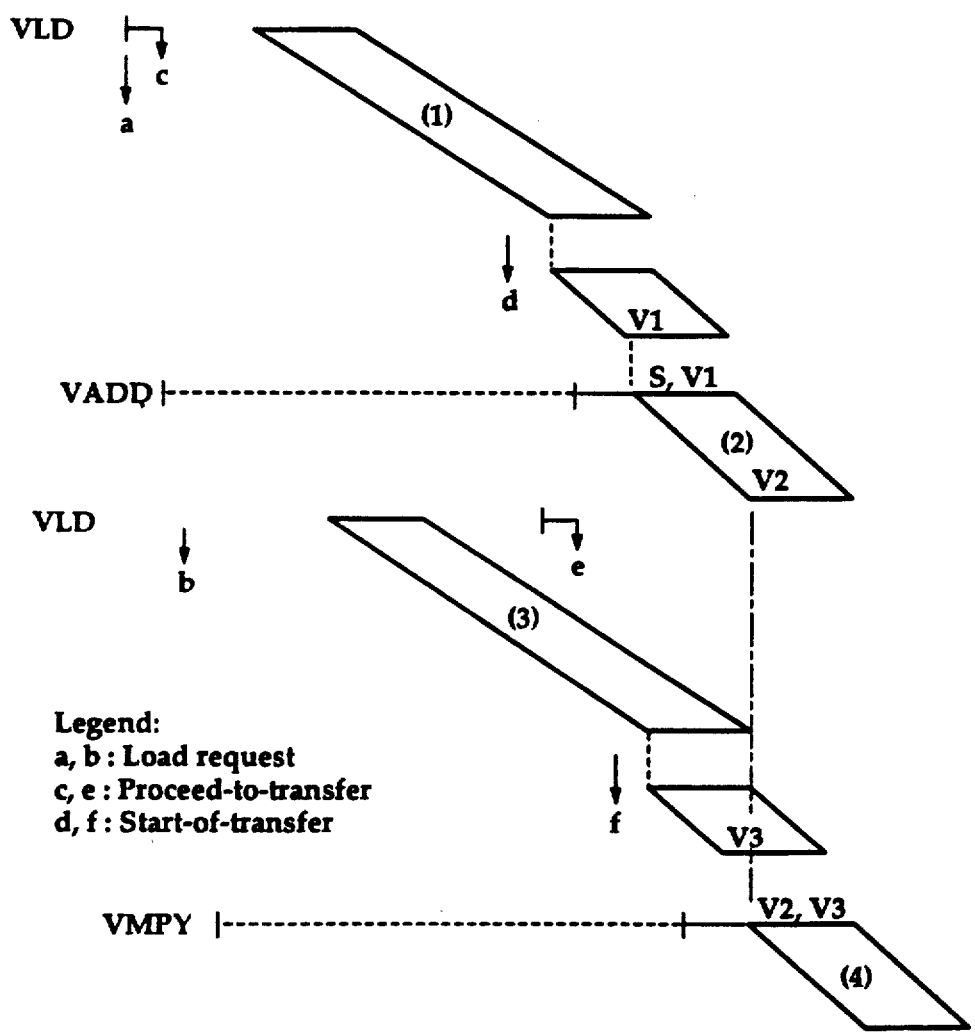
FIG. 6 is a timing diagram of vector calculations performed by the vector processor of the present invention.

The operation of the vector processor of this invention will be best visualized with reference to FIG. 6. For purposes of comparison with the aforesaid prior art, the following instructions are used, which are identical to those described with reference to the prior art:

| VLD  | V1 |                    | (1) |
|------|----|--------------------|-----|
| VADD | V2 | $\leftarrow$ S+V1  | (2) |
| VLD  | V3 |                    | (3) |
| VMPY | V4 | $\leftarrow$ V2×V3 | (4) |

With a vector load instruction (1) being stored in the instruction register 11, decoder 15 issues a load request a to memory controller 2 to cause it to start reading a first data item from memory 3 into buffer 2a. Instruction (1) is subsequently transferred to the instruction stack 12 and a calculation instruction (2) is stored in register 11, interpreted by decoder 15 and transferred to instruction stack 12. A vector load instruction (3) is then stored into register 11. Decoder 15 issues a vector request signal b to the memory controller 2 to cause it to start reading a second data item from memory 3 into buffer 2a. A calculation instruction (4) is then stored in register 11, interpreted by decoder 15 and transferred to instruction stack 12.

In this way, instructions (1), (2), (3) and (4) are successively stored in stack 12 to be processed in the order named and the necessary data items are stored in buffer 2a. Contention detector 13 first examines load vector instruction (1) and proceeds to examine the status signals from resource manager 14 to determine if vector register V1 is available in the calculation circuit 4. If V1 is available, contention detector 13 supplies a proceed-to-transfer signal c to memory controller 2 as well as to resource manager 14, which updates the appropriate flag.

Contention detector 13 proceeds to the next vector add calculation instruction (2) which involves the use of data stored in vector register V1 by the load instruction (1). At this moment, contention detector 13 knows that vector register V1 is still loaded with data necessary for instruction (2) by examining the resource status data, and puts instruction (2) in a queue.

In response to the proceed-to-transfer signal c memory controller 2 begins transferring data to vector register V1. Concurrently, memory controller 2 sends a start-of-transfer signal d to resource manager 14. On completing the data transfer, memory controller 2 sends an end-of-transfer signal to resource manager 14 to update the status of the flag associated with vector register V1.

With vector register V1 being loaded, contention detector 13 is notified of this fact by resource manager 14 and sends a proceed-to-calculate instruction to the calculation circuit 4 to cause it to execute the instruction (2) waiting in the queue, as well as to resource manager 14 to update the status of the flag associated with vector register V1. The result of the vector addition is stored in a vector register V2.

Contention detector 13 then examines appropriate status data from resource manager 14 and determines if vector register V3 is available since the next instruction (3) is a vector load instruction. If vector register V3 is available, a proceed-to-transfer signal e is applied to memory controller 2 as well as to resource manager 14.

In response to proceed-to-transfer signal e, memory controller 2 starts reading data out of buffer 2a into vector register V3. Since this data has already been written into buffer 2a from memory 3 in response to the load request signal b, a data transfer from buffer 2a to vector register V3 can begin immediately following the receipt of the proceed-to-transfer signal e. Concurrently, a start-of-transfer signal f is issued from memory controller 2 to resource manager 14 to update the flag associated with vector register V3.

After invoking instruction (3), contention detector 13 recognizes that the next instruction (4) is one that directs that a multiplication is to be performed on the contents of vector registers V2 and V3. If these vector registers are not available, contention detector 13 puts instruction (4) in a queue. As soon as they become available, contention detector 13 sends a proceed-to-calculate instruction to the calculation circuit 4 to cause it to multiply the contents of registers V2 and V3. The result of the multiplication is then stored in a vector register V4.

It is seen from the foregoing that since a load request signal is issued to memory controller 2 from the execution controller 1 as it detects a vector load instruction in the instruction stack 12, necessary data are available in buffer 2a well in advance of the time a calculation is actually performed thereon. Therefore, the amount of time taken by the memory controller 2 to access an item of vector data in the memory 3 can be reduced, preventing the vector processor from degrading its performance by the otherwise long access time.

The foregoing description shows only one preferred embodiment of the present invention. Various modifications are apparent to those skilled in the art without departing from the scope of the present invention which is only limited by the appended claims. While mention has been made of an embodiment in which the instructions stored in stack 12 are processed according to their order, the present invention could equally be applied to a vector processor in which mutually unrelated instructions are stored in such a stack by invoking a later instruction waiting in a queue before invoking an earlier instruction. In the foregoing description, since instruction (3) can be executed independently of instructions (1) and (2), the processing time can be reduced by executing instruction (3) prior to instruction (2). If instruction (3) is assumed to be one that requests data to be loaded into vector register V1 rather than into register V3, such an instruction (3) can not be invoked until instruction (2) is executed. However, by loading necessary vector data into buffer 2a in a manner described above, it is possible to prevent the vector processor from slowing down its operating speed.

What is claimed is:

1. A vector processor having a memory for storing instructions and vector data, and an instruction register for temporarily storing an instruction fetched from said memory, comprising:

an instruction stack connected to said instruction register;

decoder means connected to said instruction register for generating a load request signal when the instruction in said instruction register is a vector load instruction and transferring the vector load instruction from said register to said instruction stack;

calculator means including vector registers for performing vector calculation on contents of said vector registers;

resource manager means having a plurality of flags associated respectively with said vector registers and constantly updating said flags in accordance with contents of the associated vector registers;

contention detector means connected to said resource manager means and to said instruction stack for detecting a contention between a vector load instruction in said instruction stack and a corresponding flag in said resource manager means, the contention detector means being responsive to a vector load instruction being transferred to said stack for generating a proceed-to-transfer signal if no contention is detected between the transferred vector load instruction and said corresponding flag; and memory control means having a buffer for loading vector data from said memory into said buffer in response to said load request signal from said decoder means and transferring vector data from said buffer to said calculator means in response to said proceed-to-transfer signal from said contention detector means, said memory control means including means for supplying a start-of-transfer signal to said resource manager means when data transfer to said calculator means from said buffer begins and supplying an end-of transfer signal to said resource manager means at the end of said data transfer, said resource manager means updating the flag associated with the vector register to which data is transferred from said buffer.

2. A vector processor as claimed in claim 1, wherein said memory controller includes a second stack for storing said proceed-to-transfer signal, counter means for incrementing a count in response to said load request signal, non-zero detector means connected to said counter means for detecting when said count is not zero, and gate means for generating a pulse when the output of said non-zero detector means coincides with the proceed-to-transfer signal in said second stack, said counter means being decremented in response to said pulse, said pulse being supplied to said resource manager means as said start-of-transfer signal.

* * * * *